United States Patent [19]

Luttermann et al.

[11] Patent Number: 5,201,921
[45] Date of Patent: Apr. 13, 1993

[54] PROCESS FOR IDENTIFYING PLASTICS BY ADDITION OF FLUORESCENT DYE

[75] Inventors: Klaus Luttermann, Lohmar; Uwe Claussen; Aziz El Sayed, both of Leverkusen; Reinhard Riess, Bergisch-Gladbach, all of Fed. Rep. of Germany

[73] Assignee: Bayer Aktiengesellschaft, Leverkusen, Fed. Rep. of Germany

[21] Appl. No.: 756,339

[22] Filed: Sep. 6, 1991

[30] Foreign Application Priority Data

Sep. 14, 1990 [DE] Fed. Rep. of Germany ....... 4029167

[51] Int. Cl.$^5$ .......................... B07C 5/34; B29B 17/02; C08J 3/20; C08J 11/04
[52] U.S. Cl. ............................................. 8/506; 8/497; 8/513; 8/618; 8/648; 209/3.3; 209/4; 209/576; 209/579; 209/587; 209/930
[58] Field of Search ..................... 8/506, 648; 209/3.3, 209/4, 579

[56] References Cited

U.S. PATENT DOCUMENTS

| | | | |
|---|---|---|---|
| 4,208,272 | 6/1980 | Moudgil | 209/3.3 |
| 4,303,701 | 12/1981 | Torgersen et al. | 8/507 |
| 4,321,133 | 3/1982 | DiGiacomo | 209/3.3 |
| 4,329,378 | 5/1982 | Tarumi et al. | 427/157 |
| 4,462,495 | 7/1984 | McKinley et al. | 209/3.3 |
| 4,702,574 | 10/1987 | Bawa | 8/507 |
| 4,719,657 | 1/1988 | Bawa | 8/453 |
| 4,813,973 | 3/1989 | Winnik et al. | 8/647 |
| 4,929,250 | 5/1990 | Huns et al. | 8/507 |
| 4,963,160 | 10/1990 | Huns et al. | 8/507 |
| 4,987,539 | 1/1991 | Moore et al. | 209/579 |
| 5,024,753 | 6/1991 | Chriswell et al. | 209/1 |
| 5,072,833 | 12/1991 | Hansen et al. | 209/3.3 |

Primary Examiner—A. Lionel Clingman
Attorney, Agent, or Firm—Connoly & Hutz

[57] ABSTRACT

Process for rendering a plastic identifiable by adding 5 to 10,000 ppb of a fluorescent marker to the plastic during or after is manufacture.

11 Claims, No Drawings

PROCESS FOR IDENTIFYING PLASTICS BY ADDITION OF FLUORESCENT DYE

The reuse of plastics recovered from refuse and waste presupposes that they can be sorted according to their chemical constitution.

It is for example in some cases possible to assign the shape of a plastic article to a particular manufacturer or product (sample identification) or to use spectroscopic methods. Under the specific conditions involved such methods are however not sufficiently reliable since the composition of the samples, their state of preservation, the use marks and contaminations contained therein and their age cause them to vary greatly in appearance and an unfeasible amount of time is required for viewing the correspondingly large number of objects. Finally, it is also possible to classify plastics via their density.

Plastics consisting of molecules having a high content of hetero atoms usually have a higher specific density than those consisting of pure hydrocarbons. It is thus possible, for example, to carry out fractionated preliminary separation in order to obtain polyolefins such as polypropylene and high- and low-pressure-process polyethylene in one single fraction.

This fraction forms a major constituent of refuse. Thus the normal content of plastics in household waste consists of 65% of polyolefins, 15% of polystyrene, 10% of polyvinyl chloride, 5% of polyethylene terephthalate and 5% of other plastics (Eu. Plast. News, 1989(12), 41).

There is therefore the need to be able to separate the polyolefin fraction even further, in order to obtain recyclable materials. Only pure materials can be usefully recycled.

It is known to mark plastics by incorporating additives in small quantities so that they can be recognised during processing. This can be done relatively simply if the polymer contains polar groups which are capable of binding the additives. Thus V. Nowotny and I. Alexandru (J. Appl. polym. Sci., 24, 1321-1328 (1979)) produced laser markings on polyethylene terephthalate using disperse dyes and obtained high resolutions. Similar proposals, in particular for identifying products from specific manufacturers relate to the use of fluorescent dyes (e.g. Jap. Pats. Nos. 62,271,734 and 62,167,072, German Offenlegungsschrifts 32,41,489, 29,18,487, U.S. Pat. Nos. 4,329,378, 4,303,701 and 4,813,973 and EP 30 577).

Marking becomes more difficult when the polymer does not contain any polar groups, as in the case of polyolefins. In the latter customary additives are ineffective. In order to avoid this problem W. T. Tang, G. Hadziioannou, B. A. Smith and C. W. Frank have for example suggested (Polymer, 29 1313-1317 (1988)) chloromethylating polystyrene in order to enable fluorescent dyes to be incorporated therein. Further proposals of this kind have been made which are characterised by separate marking steps. The processes concerned are all unsuitable for solving the problem addressed by the present invention, since they necessarily prolong the production process and thus entail an unacceptable increase in the price of the product.

The present invention relates to a process for rendering plastics identifiable which is characterised in that 5-10,000 ppb of a fluorescent marker is added to the plastic during or after its manufacture. Suitable markers are preferably fluorescent dyes from the series comprising coumarins (German Offenlegungsschrifts 2,125,811, 36 09 804 and 25,29,434), perylene dyes (German Offenlegungsschrift No. 31,49,620), benzanthrones (German Offenlegungsschrifts Nos. 26,17,322, 26,17,321 and 2,154,753), anthrapyrimidines (European Patent No. 32,373 and German Offenlegungsschrift No. 3,001,188) and anthrapyridones (Jap. Pats. Nos. 49,75,652 and 46,76,927). Depending on the substrate the dyes have to be lipophilic or branch-substituted.

It is particularly preferred to add complexes of rare earth metals, in particular Eu or Tb complexes which are distinguished by sharply defined emission bands and can be identified by irradiation with a normal lamp. A further advantage of these substances is that they display considerably longer-lasting fluorescence than customary organic fluorescent dyes and therefore produce a signal which can easily be differentiated from the fluorescent emissions of other substances which may possibly be present.

The addition of such small quantities of the coloured marker does not change the properties of the polymers.

The invention also relates to the use of the identification process according to the invention for the classification of plastic refuse. The excitation of the dye in the object to be tested, for example by means of a laser, produces scattered emitted light which is intercepted by a detector and recorded. This signal is used for triggering off the classifying operation. In the case of small, granulated particles, this can involve electrostatic charging and deflection in an electric field or, in the case of larger particles, a simple process of mechanical separation.

The present invention thus also relates to a process for sorting plastic waste or plastic refuse, which is characterised in that the plastics which have been rendered identifiable by the addition of a fluorescent marker are classified according to type of plastic on the basis of the fluorescence radiation emitted.

This process, which is distinguished by its great simplicity, also makes it possible to separate polyolefin fractions even further following preliminary separation based on density. If several coloured markers of different emission wavelengths or intensities are used the various constituents of the polyolefin fraction can be identified simultaneously and separated out.

It is particularly important for the marking substance to display high-quality and wide-ranging use fastness properties. It must also be non-toxic.

The dyes are used in quantities of 5-10,000 ppb. Since high concentrations of coloured markers can lead to colour distortions it is preferable to use them in concentrations which are as low as possible.

EXAMPLE 1

2,000 g of polyethylene are mixed with 100 mg of 3,9-bis[2-(5,6(1,1,3,3-tetramethyl)cyclopenta)-benzoxazolyl]-perylene and processed into plates of a thickness of 2 mm at 200° C. The fluorescence is measured as the reflection from the surface by excitation at the absorption maximum of the dye. The values listed in column 1 are obtained:

|  | 1 | 2 |
| --- | --- | --- |
| wavelength of excitation: | 526 nm | 525 nm |
| maximum emission: | 576 nm | 573 nm |
| Stokes shift: | 50 nm | 48 nm |

|  | 1 | 2 |
| --- | --- | --- |
| integrated peak area signal: | 1,115,120 | 774,122 |

If the same procedure is followed as described above and the same quantity of polypropylene is used instead of polyethylene at a temperature of 230° C., the values listed in column 2 are obtained.

EXAMPLE 2

If the same procedure is followed as in Example 1, but 2-methyl-[n-hexyl]-aminodibenzo[f,i,j]isoquinolin-7-one (prepared according to Houben Weyl, vol. 7/3c, p. 346 (1979), 4th edition) is used as the dye, the values listed in column 1 are obtained for polyethylene and the values listed in column 2 for polypropylene:

|  | 1 | 2 |
| --- | --- | --- |
| wavelength of excitation: | 459 nm | 456 nm |
| maximum emission: | 532 nm | 536 nm |
| Stokes shift | 73 nm | 80 nm |
| integrated peak area signal: | 598,039 | 236,602 |

EXAMPLE 3

If the same procedure is followed as in Example 1, but the same quantities of a) N,N-dimethyl-tetrachloro-perylenetetracarboxylic acid diimide (prepared according to German Offenlegungsschrift No. 31,49,620) and b) 7-diethyl-amino-4-cyano-3-(2-[5-trifluoromethyl)-thiadiazolyl coumarin are used instead of the dye mentioned in Example 1, the values listed in column 1 are obtained for polyethylene and the values listed in column 2 for polypropylene:

|  | 1 | 2 |
| --- | --- | --- |
| a) |  |  |
| maximum excitation: | 517 nm | 514 nm |
| maximum emission: | 549 nm | 546 nm |
| Stokes shift: | 32 nm | 32 nm |
| integrated peak area signal: | 957,713 | 544,367 |
| b) |  |  |
| maximum excitation: | 521 nm | 482 nm |
| maximum emission: | 571 nm | 571 nm |
| Stokes shift: | 50 nm | 89 nm |
| integrated peak area signal: | 1,119,877 | 348,007 |

EXAMPLE 4

The dye LISA yellow (9400 57400) was added to small test plates of polycarbonate in the usual commercial colours black, white and transparent.

For this purpose the substances were mixed in granulated form and injection-moulded to form small plates. Then a fluorescence spectrogram of the surface was made.

The results are summarised in the table.

The fluorescence signal of the LISA dye is clearly detectable down to concentrations of $25 \times 10^{-4}$ [g/kg].

| sample carrier substance | dye concn. [× $10^{-4}$ g/kg] | max. emission | integral |
| --- | --- | --- | --- |
| polycarbonate | 0 | 579.7 | 2475 |
| black | 5 | 578.0 | 4622 |
|  | 25 | 569.8 | 24369 |
| polycarbonate | 0 | 552.4 | 100580 |
| white | 5 | 571.4 | 427126 |
|  | 25 | 576.3 | 1330803 |
| polycarbonate | 50 | 571.4 | 631924 |
| colourless | 25 | 574.7 | 715873 |
| (transparent) | 0.5 | 571.4 | 92467 |

EXAMPLE 5

5 small test plates were prepared from bisphenol-A polycarbonate, each of which contains 0.01% by weight of a fluorescent dye.

The emission maxima of the plates are as follows:

| No. | nm |
| --- | --- |
| 1 | 521 (green) |
| 2 | 590 (yellow) |
| 3 | 595 (orange) |
| 4 | 623 (red) |
| 5 | 635 (dark red) |

All plates are excited with the same wavelength of 480 nm and the following results are obtained:

| plate no. | emission nm | relative peak height |
| --- | --- | --- |
| 1 | 514 | 285 |
| 2 | 571 | 201 |
| 3 | 560 | 265 |
| 4 | 588 | 315 |
| 5 | 599 | 314 |

On irradiating plate 1 with 482 nm the emission was at 513 nm and the relative peak height was 268; on irradiating plate 5 with 576 nm the emission was at 597 nm and the relative peak height was 316.

Thus the emission and the peak height are, within certain limits, virtually independent of the excitation wavelength. This means that all 5 fluorescent dyes can be excited to emission by means of only one excitation wavelength. This means that the 5 plates can be differentiated by their emission even when exciting them with only one wavelength. The model experiment shows that the classification process according to the invention is practicable and can even be automated.

EXAMPLE 6

266 mg (1 mmol) of naphthoyltrifluoroacetone in 1000 ml of dichloroethane are stirred with 366 mg (1 mmol) of $EuCl_3 \cdot H_2O$ in 1000 ml of methanol/$H_2O$ 10:1 at room temperature for 1 hour. The resulting complex is applied to polycarbonate films (transparent, thickness: 116 μm). The following values are obtained on excitation at the absorption maximum of the diketone:

| wavelength of excitation: | 335 nm |
| --- | --- |
| maximum emission: | 615 nm |
| Stokes shift: | 270 nm |
| integrated peak area signal | 12,319 |

We claim:

1. Process for sorting plastic waste or plastic refuse, wherein plastics which have been rendered identifiable by adding 5 to 10,000 ppb of a fluorescent marker to the plastic during or after the manufacture of the plastic are classified according to each type of plastic based on the fluorescence radiation emitted from the plastic.

2. The process of claim 1, wherein said fluorescent marker comprises at least one fluorescent dye selected from the group consisting of coumarins, perylene dyes, benzanthrones, anthrapyrimidines and anthrapyridones.

3. The process of claim 2, wherein said fluorescent dye is either lipophilic or branch-substituted.

4. The process of claim 1, wherein said fluorescent marker comprises complexes of rare earth metals.

5. The process of claim 4, wherein said complexes of rare earth metals comprise at least one substance selected from the group consisting of Eu complexes and Tb complexes.

6. The process of claim 5, wherein said complexes demonstrate sharply defined emission bands and can be identified by irradiation with a normal lamp.

7. The process of claim 1, wherein the radiation emitted from the plastics is generated by a laser.

8. The process of claim 1, wherein the radiation emitted from the plastic is intercepted by a detector.

9. The process of claim 8, wherein the detector records the radiation emitted from the plastic as a signal and said signal is used for triggering a classifying operation.

10. The process of claim 9, wherein the plastic waste or plastic refuse comprises small particles and said classifying operation comprises electrostatic charging and deflection in an electric field.

11. The process of claim 9, wherein the classifying operation comprises mechanical separation.

* * * * *